March 10, 1964  A. MOTTU  3,124,015
MACHINE TOOL OF THE VERTICAL SPINDLE TYPE
Filed Dec. 13, 1961  2 Sheets-Sheet 1

INVENTOR.
ANDRÉ MOTTU
BY
ATTORNEY 3,124,015
MACHINE TOOL OF THE VERTICAL SPINDLE TYPE
André Mottu, Geneva, Switzerland, assignor to Societe Genevoise d'Instruments de Physique, Geneva, Switzerland, a firm of Switzerland
Filed Dec. 13, 1961, Ser. No. 159,495
Claims priority, application Switzerland Dec. 21, 1960
5 Claims. (Cl. 77—4)

This invention relates to a machine tool of the vertical spindle type, comprising a sliding spindle-carrying quill and means for balancing the weight of the latter.

The means most frequently used for balancing the weight of the quill comprises a spiral spring acting on the drive wheel axle which carries a pinion meshing with a rack disposed on the side of the quill.

Another means frequently used is a counterweight which pulls on a chain passing over one or more rollers, the opposite end of said chain being attached to the quill by a lateral eyebolt.

Since these means act on the side of the quill, they produce thereon a tilting moment, the effects of which are hardly perceptible on the scale on which checking is conventionally carried out on machine tools. However, measurements taken with a very high degree of accuracy prove that this moment results in a slight tilting of the quill with respect to the vertical.

Attempts have been made to obviate this disadvantage, for example by applying a lateral thrust on the quill to compensate for the tilting moment due to the balancing device.

The machine tool according to the present invention provides a much more radical solution of this problem. The invention is characterised in that the balancing means exercise their action at least two points of the quill, means being provided to distribute the forces exerted at the said points of action, the whole in such manner that the resultant of the balancing forces passes through the centre of gravity of the quill.

One embodiment of the subject of the invention is illustrated, by way of example, in the accompanying drawings, in which.

Figure 1:
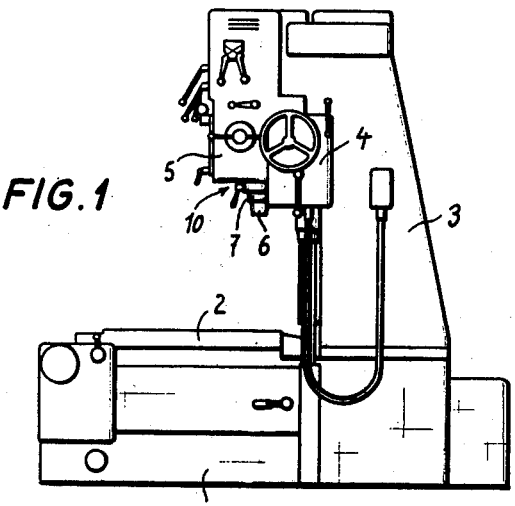
FIG. 1 is a side view of a jig boring machine to which the invention has been applied.

The jig boring machine illustrated comprises a frame 1 carrying a table 2 and having two columns 3, one of which is visible in FIG. 1. These columns support a cross-member 4 on which is mounted a head 5 carrying a vertical spindle 6 which is mounted rotatably inside an axially movable quill.

Figure 2:
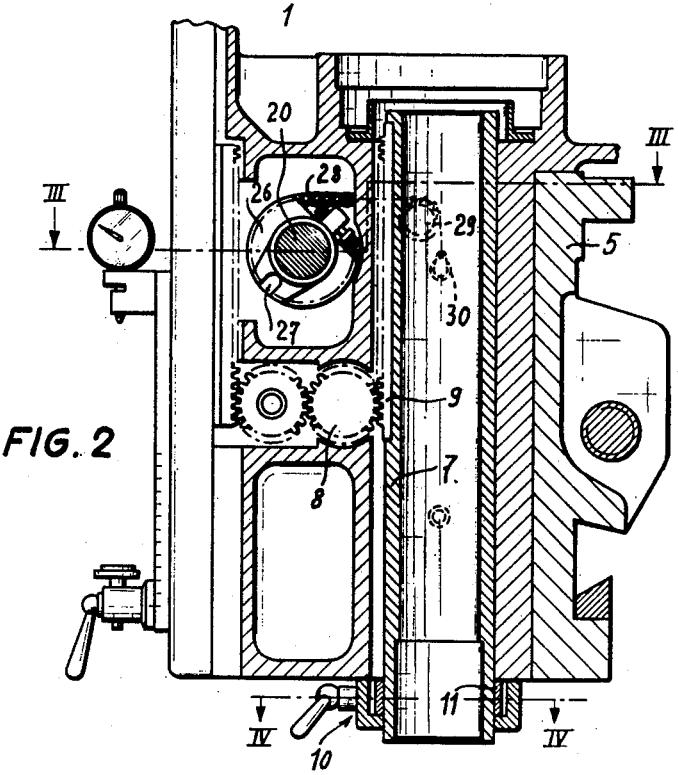
FIG. 2 is a vertical section thereof through the axis of the spindle in a plane parallel to that of FIG. 1, to a larger scale.
Figure 4:
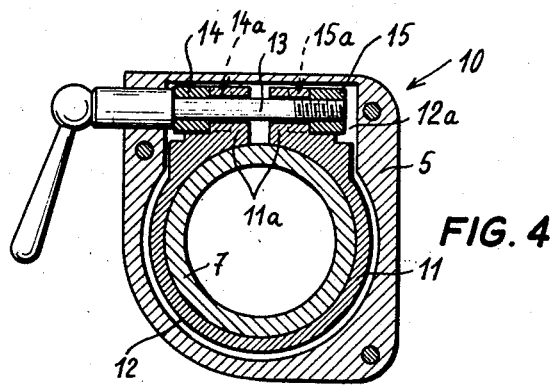
FIG. 4 is a section of a detail on the line IV—IV in FIG. 1.

Axial movements of the latter, which enable a tool to be fed, for drilling or boring for example, are produced by means of a pinion 8 driven by means (not shown) and engaging with a rack 9 connected to the quill (FIG. 2). A locking device 10 (FIGS. 2 and 4) enables the quill to be locked for example when surfacing or slotting operations have to be carried out. This locking device comprises an open collar 11 housed in an annular groove 12 of the frame of the head 5 and surrounding the quill 7. A locking screw 13 acts on the two ends of the collar 11 in order to lock it by means of two wedges 14 and 15 each having an inclined axial face 14a and 15a respectively cooperating with a corresponding axial face of the ends 11a of the collar. Thus the screw 13 not only effects locking of the collar 11 on the quill 7 but also by relative displacement of the ends of the collar and of the locking wedges 14 and 15, axial locking of these elements in a tangential recess 12a of the frame of the spindle 5, into which recess the annular groove 12 leads. Thus the quill is both locked and centred in a very accurate manner.

A device for balancing the weight of the quill acts on the latter when the locking device 10 is not in use. This balancing device is shown in detail in FIGS. 2 and 3. It comprises a spiral spring 16 housed in a fixed case or drum 17. The outer end of the spring 16 is fixed at 18 to the drum 17 while its inner end is attached to a member 19 connected to a shaft 20 mounted rotatably by means of bearings 21 in the frame of the head 5. A compensating lever 22 is connected to a journal 23 mounted rotatably by means of bearings 24 on the shaft 20. The axis of the journal 23 is perpendicular to the axis of the shaft 20. The latter carries two toothed drums 26 which are mounted loosely thereon by means of needle bearings 25. The side faces of these two drums opposite one another each have a notch 27 in which engages one of the ends of the compensating lever 22, said ends having a spherical head 22a.

Figure 3:
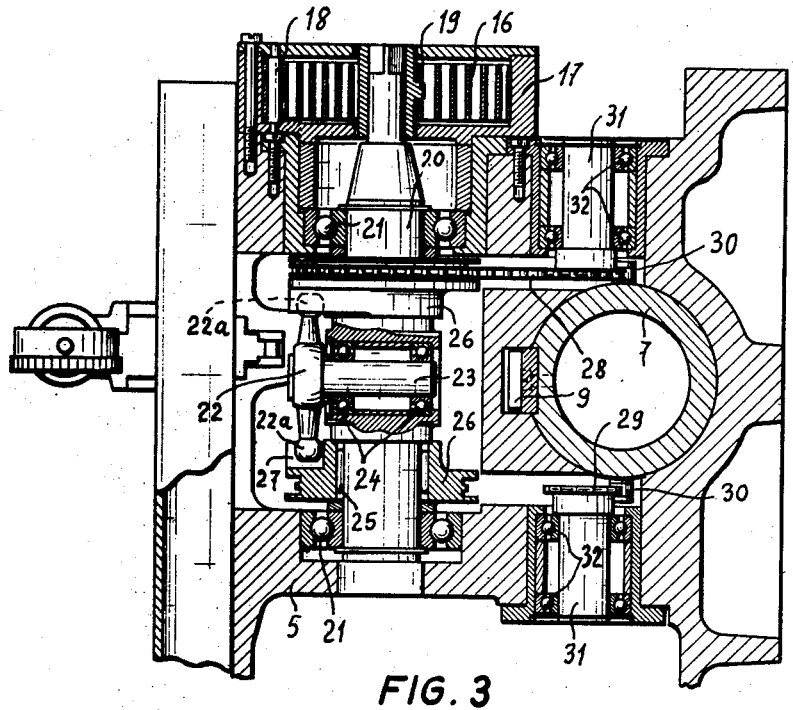
FIG. 3 is a horizontal section on the broken line III—III in FIG. 2, again to a larger scale.

Two quill suspension chains 28, one of which is not shown in FIG. 3, pass around the drums 26 to which they are each fixed by one end, pass over reversing sprockets 29 and are attached at 30 to eyebolts carried by the quill 7. The sprockets 29 are each connected to a journal 31 rotating in bearings 32 carried by the frame of the head 5.

The eyebolts 30 being diametrically opposite with respect to the axis of the quill, the tilting moments produced on the quill by the forces exerted by the chains 28 due to the radial distance between the point of application of these forces and the axis of the quill, compensate one another. By means of the compensating lever 22, by which the moment exerted on the shaft 20 by the spring 16 is transmitted and which distributes this moment to the two drums 26 so as to compensate any inequalities which might occur in the power transmission (various friction for example), the two counteracting moments exerted on the quill neutralise one another perfectly.

In a variant, the chains 28 can be replaced by cables. The drums 26 may also be replaced by gear-wheels directly driving two diametrically opposite racks connected to the quill 7. Any other connecting system between the rotary elements driven by the compensating lever and the quill may also be considered without thereby departing from the scope of the present invention.

Similarly, the quill balancing device may act on said quill not at two diametrically opposite points but at three points disposed preferably at 120° with respect to one another in relation to the axis of the quill, or at an even larger number of points, which are preferably equally distributed angularly with respect to the axis of the quill.

The balancing spring 16 may be replaced by a counterweight suspended from a flexible line winding around a drum carried by the shaft 20.

It should be noted that the arrangement described and illustrated not only enables the weight of the quill to be balanced without creating any tilting moment but would, if necessary, provide compensation for any tilting moment due, for example, to an accessory carried by the quill with a centre of gravity situated outside the vertical axis passing through the centre of gravity of the quill.

What I claim is:
1. A machine tool of the vertical spindle type, comprising a sliding spindle-carrying quill and means for bal- ancing the weight thereof, in which the said balancing means comprise a shaft, a compensating lever rotatably mounted on the said shaft, around an axis of rotation coinciding with a diameter of the said shaft, a balancing element acting on the said shaft for urging it to rotate in one direction, and two rotary elements loosely mounted on the said shaft and on each of which acts one end of the said compensating lever, said rotary elements being connected to the quill of the machine in such manner that the moment exerted by the compensating lever upon each of the said rotary elements results in forces exerted on the quill parallel to its longitudinal axis.

2. A machine tool of the vertical spindle type, comprising a sliding spindle-carrying quill and means for balancing the weight thereof, in which the said balancing means comprise a shaft, a compensating lever rotatably mounted on the said shaft, around an axis of rotation coinciding with a diameter of the said shaft, a balancing element acting on the said shaft for urging it to rotate in one direction, two drums loosely mounted on the said shaft and on each of which acts one end of the said compensating lever, and two flexible connecting elements each wound over one of the said drums and each connected to the quill of the machine in such manner that the moment exerted by the compensating lever upon each of the said rotary elements results in forces exerted on the quill parallel to its longitudinal axis.

3. A machine tool of the vertical spindle type, comprising a sliding spindle-carrying quill and means for balancing the weight thereof, in which the said balancing means comprise a shaft, a compensating lever rotatably mounted on the said shaft, around an axis of rotation coinciding with a diameter of the said shaft, a spiral spring one end of which is fastened to the said shaft for urging it to rotate in one direction, and two rotary elements loosely mounted on the said shaft and on each of which acts one end of the said compensating lever, said rotary elements being connected to the quill of the machine in such manner that the moment exerted by the compensating lever upon each of the said rotary elements results in forces exerted on the quill parallel to its longitudinal axis.

4. A machine tool of the vertical spindle type, comprising a sliding spindle-carrying quill and means for balancing the weight thereof, in which the said balancing means comprise a shaft, a compensating lever rotatably mounted on the said shaft, around an axis of rotation coinciding with a diameter of the said shaft, a spiral spring one end of which is fastened to the said shaft for urging it to rotate in one direction, two drums loosely mounted on the said shaft, and the side face of which is provided with a recess, a spherical head at each extremity of the said compensating lever, each of the said spherical heads being engaged in one of the said recesses of the said drums, and two flexible connecting elements each wound over one of the said drums and each connected to the quill of the machine in such manner that the moment exerted by the compensating lever upon each of the said rotary elements results in forces exerted on the quill parallel to its longitudinal axis.

5. In a machine of the vertical spindle type, comprising a sliding spindle-carrying quill and means for balancing the weight thereof, the feature that said balancing means acts on the quill at two diammetrically opposite points with respect to the longitudinal axis of the quill and is in combination with means for distributing the forces at said points of action so that the resultant of the balancing forces produced by said balancing means passes through the center of gravity of the quill.

References Cited in the file of this patent

UNITED STATES PATENTS

| | | |
|---|---|---|
| 1,437,510 | Gerber | Dec. 4, 1922 |
| 2,388,955 | Couse | Nov. 13, 1945 |

FOREIGN PATENTS

| | | |
|---|---|---|
| 401,311 | Germany | Aug. 30, 1924 |
| 743,195 | Germany | Dec. 20, 1943 |
| 885,426 | Great Britain | Dec. 28, 1961 |